United States Patent [19]
An

[11] Patent Number: 5,526,221
[45] Date of Patent: Jun. 11, 1996

[54] DEGAUSSING CIRCUIT

[75] Inventor: Jong K. An, Kyungsangbook-Do, Rep. of Korea

[73] Assignee: Goldstar Electron Co., Ltd., Choongchungbook-Do, Rep. of Korea

[21] Appl. No.: 136,063

[22] Filed: Oct. 14, 1993

[30] Foreign Application Priority Data

Oct. 16, 1992 [KR] Rep. of Korea .................. 19989/1992

[51] Int. Cl.⁶ ............................................. H01F 13/00
[52] U.S. Cl. ........................... 361/149; 361/150; 361/267
[58] Field of Search ........................... 361/149–151, 361/267; 315/8

[56] References Cited

U.S. PATENT DOCUMENTS

| | | | |
|---|---|---|---|
| 2,962,622 | 11/1960 | Popovich | 361/150 X |
| 3,944,870 | 3/1976 | Sutton, Jr. et al. | |
| 4,700,114 | 10/1987 | Sutherland, II | 315/8 X |
| 4,742,270 | 5/1988 | Fornsler et al. | 315/8 |
| 5,170,096 | 12/1992 | Kang et al. | 361/150 X |
| 5,241,448 | 8/1993 | Stolte | 361/150 |
| 5,357,398 | 10/1994 | Kamijoh | 361/267 |

FOREIGN PATENT DOCUMENTS 57-184389 11/1982 Japan .
59-148484 8/1984 Japan .
1-243685 9/1989 Japan .

*Primary Examiner*—Fritz M. Fleming
*Attorney, Agent, or Firm*—Lowe, Price, LeBlanc & Becker

[57] ABSTRACT

A degaussing circuit comprising a rectifying circuit for rectifying an AC voltage inputted therein into a DC voltage, a capacitor for smoothing the DC voltage from the rectifying circuit, a RC charging circuit for charging with the DC voltage smoothed by the capacitor, a positive temperature coefficient resistor having a resistance which is increased with an increase in a temperature due to an AC current flowing therethrough upon power supply, a degaussing coil for removing a magnetic field in response to the AC current flowing through the positive temperature coefficient resistor thereto, a relay for controlling the flow of the AC current through the positive temperature coefficient resistor to the degaussing coil, and a relay driving circuit for controlling an ON/OFF state of the relay in response to the voltage charged on the RC charging circuit. A transistor in the relay driving circuit is turned off by the voltage charged on the charging circuit as the resistance of the positive temperature coefficient resistor rises due to the AC current after the lapse of a predetermined time period from a point of time of the power supply and the relay is turned off as the transistor is turned off. Therefore, no current flows through the degaussing coil although the resistance of the positive temperature coefficient resistor is reduced as the temperature falls.

10 Claims, 3 Drawing Sheets

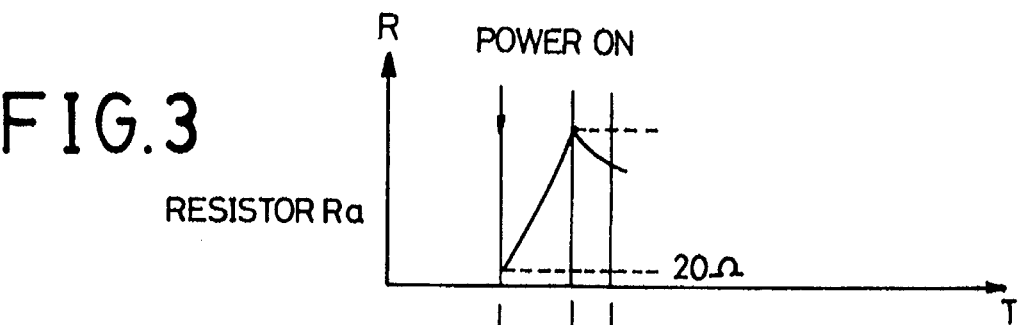
FIG.3 RESISTOR Ra
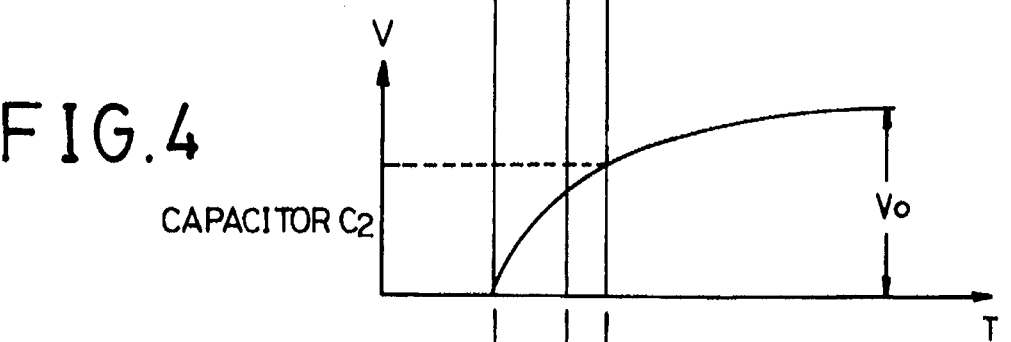
FIG.4 CAPACITOR C2
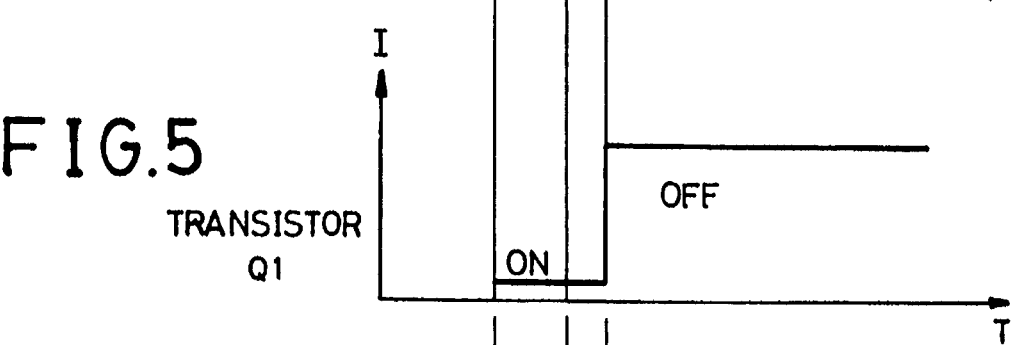
FIG.5 TRANSISTOR Q1
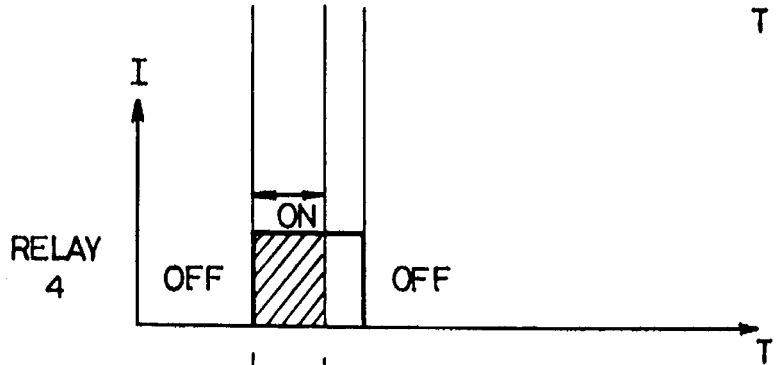
FIG.6 RELAY 4
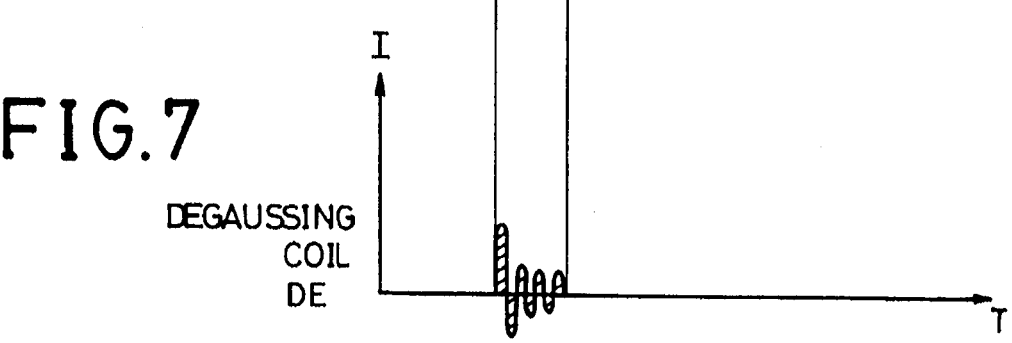
FIG.7 DEGAUSSING COIL DE

DEGAUSSING CIRCUIT

BACKGROUND OF THE INVENTION

1. Field of the Invention

The present invention relates in general to degaussing circuits, and more particularly to a degaussing circuit for removing a magnetic field upon application of a power supply and then controlling an alternating current (AC) current flowing through a positive temperature coefficient resistor to a degaussing coil so as to reduce power consumption and avoid an increase in an ambient temperature.

2. Description of the Prior Art

FIG. 1 is an illustration of a circuit diagram of a conventional degaussing circuit. As shown in this drawing, the conventional degaussing circuit comprises a rectifying circuit 1 for rectifying an AC voltage, inputted through a switch SW1 and a fuse, into a direct current (DC) voltage, a capacitor C1 for smoothing the DC voltage from the rectifying circuit 1 to maintain a constant voltage Vo at an output terminal of the degaussing circuit, a degaussing coil DE for removing a magnetic field present in a tube of a monitor or a television (TV) upon application of a power supply voltage, and a thermistor 2 for controlling the flow of a current through the degaussing coil DE to maintain a constant temperature. The thermistor 2 includes a positive temperature coefficient resistor Ra having a resistance which increases with an increase in the temperature, and an internal resistor Rb for generating heat to maintain the resistance of the positive temperature coefficient resistor Ra constant.

The operation of the conventional degaussing circuit with the above-mentioned construction will hereinafter be described.

As the switch SW1 is turned on, the AC voltage is applied through the fuse to the rectifying circuit 1, which rectifies the applied AC voltage into the DC voltage. The DC voltage from the rectifying circuit 1 is smoothed by the capacitor C1, thereby causing the voltage Vo at the output terminal to be maintained constant.

On the other hand, if the AC current flows to the degaussing coil DE through the positive temperature coefficient resistor Ra in the thermistor 2 upon application of a power supply voltage, the magnetic field in the tube of the monitor or the TV is removed by the degaussing coil DE.

The resistance of the positive temperature coefficient resistor Ra in the thermistor 2 is noticeably smaller than 20Ω at a normal temperature of, for example, 25° C. As a result, at the normal temperature of 25° C., the AC current flows to the degaussing coil DE through the positive temperature coefficient resistor Ra upon application of a power supply voltage. However, after a predetermined time period (for example, 1 to 2 sec) has elapsed, the resistance of the positive temperature coefficient resistor Ra rises to several tens mega ohms MΩ as the temperature rises due to the AC current. In this case, the positive temperature coefficient resistor Ra is as good as opened.

At this time, the internal resistor Rb in the thermistor 2 generates the heat so that the temperature of the positive temperature coefficient resistor Ra can be maintained constant. As a result, the resistance of the positive temperature coefficient resistor Ra remains at a large value. Hence, the AC current flows to the degaussing coil DE only upon application of a power supply voltage, whereas it does not flow to the degaussing coil due to the resistance of the positive temperature coefficient resistor Ra after the lapse of the predetermined time period.

However, the above-mentioned conventional degaussing circuit is disadvantageous since the internal resistor Rb generates the heat continuously to maintain the temperature of the positive temperature coefficient resistor Ra constant, which results, in large power consumption and an ambient temperature increase.

SUMMARY OF THE INVENTION

Therefore, the present invention solves the above problem, and it is an object of the present invention to provide a degaussing circuit for controlling an AC current flowing through a positive temperature coefficient resistor to a degaussing coil using a RC charging circuit, a relay and a relay driving circuit, to prevent power consumption and an increase in an ambient temperature.

In accordance with the present invention, the above and other objects can be accomplished by a degaussing circuit comprising a rectifying circuit, a capacitor, an RC charging circuit, a positive temperature coefficient resistor, a degaussing coil, a relay and a relay driving circuit. The rectifying circuit rectifies an AC voltage inputted therein into a DC voltage the capacitor smooths the DC voltage from the rectifying circuit. The RC charging circuit charges the DC voltage smoothed by the capacitor, and the RC charging circuit includes a capacitor and a first resistor. The positive temperature coefficient resistor has a resistance which increases with an increase in a temperature due to an AC current flowing therethrough upon applications of a power supply voltage and a degaussing coil removes a magnetic field in response to the AC current flowing through the positive temperature coefficient resistor thereto. The relay controls the flow of the AC current through the positive temperature coefficient resistor to the degaussing coil, and relay driving circuit controls the ON/OFF of the relay in response to the voltage charged on the RC charging circuit. The relay driving circuit includes a second resistor having one side connected to an output of the rectifying circuit, a diode having a cathode connected to the other side of the second resistor and a transistor having a base connected to an output of the RC charging circuit, a collector connected to an anode of the diode and an emitter connected to a ground.

BRIEF DESCRIPTION OF THE DRAWINGS

The above and other objects, features and advantages of the present invention will be more clearly understood from the following detailed description taken in conjunction with the accompanying drawings, in which:

FIG. 3 is a graph illustrating a variation in a resistance of a positive temperature coefficient resistor with an increase in a temperature in accordance with the present invention;

FIG. 4 is a graph illustrating a variation in a voltage on a capacitor with the lapse of time in accordance with the present invention;

FIG. 5 is a graph illustrating an ON/OFF timing of a transistor in accordance with the present invention;

FIG. 6 is a graph illustrating an ON/OFF timing of a relay in accordance with the present invention; and FIG. 7 is a graph illustrating a vibrated state of a current flowing through a degaussing coil in accordance with the present invention.

DETAILED DESCRIPTION OF THE PREFERRED EMBODIMENT

Figure 1:
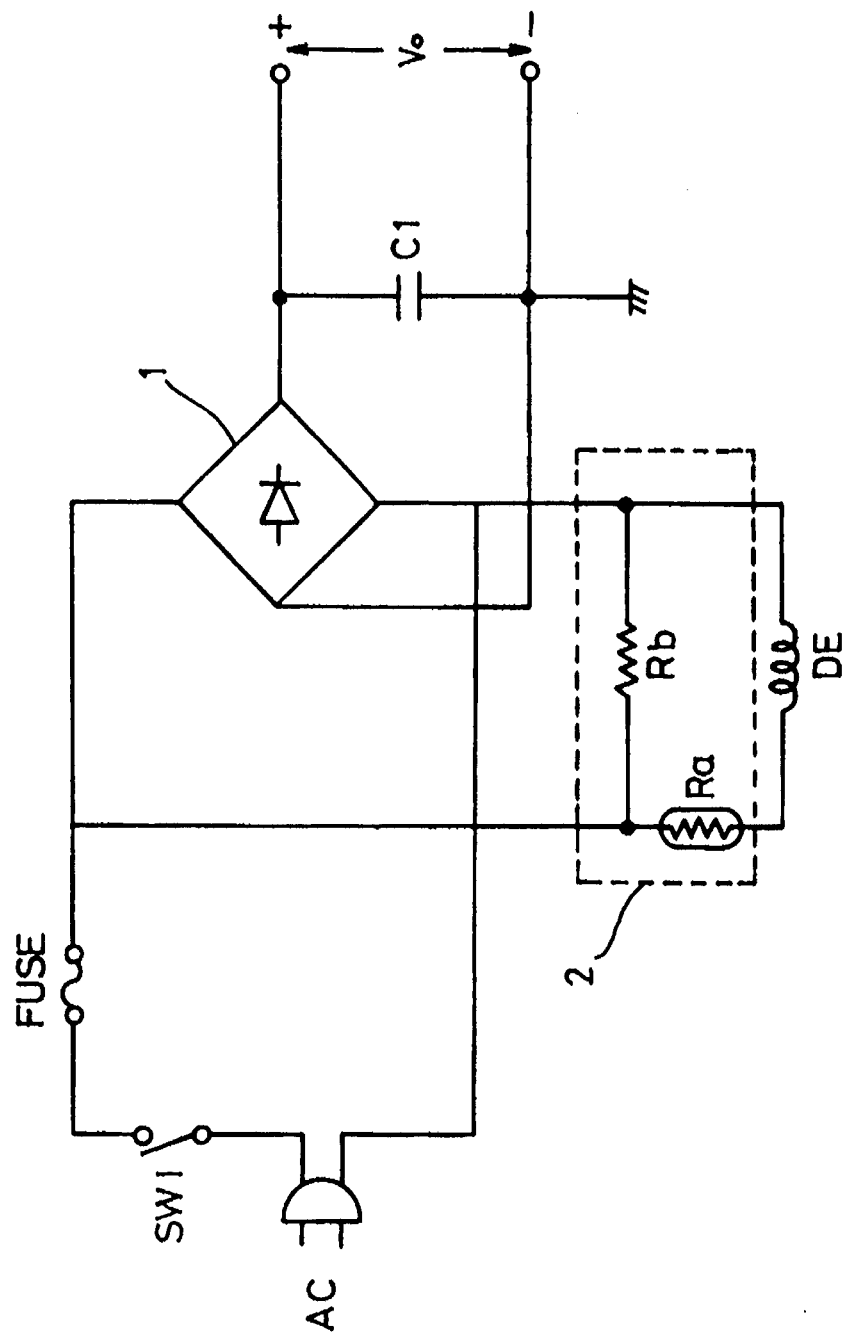
FIG. 1 is a circuit diagram of a conventional degaussing circuit.
Figure 2:
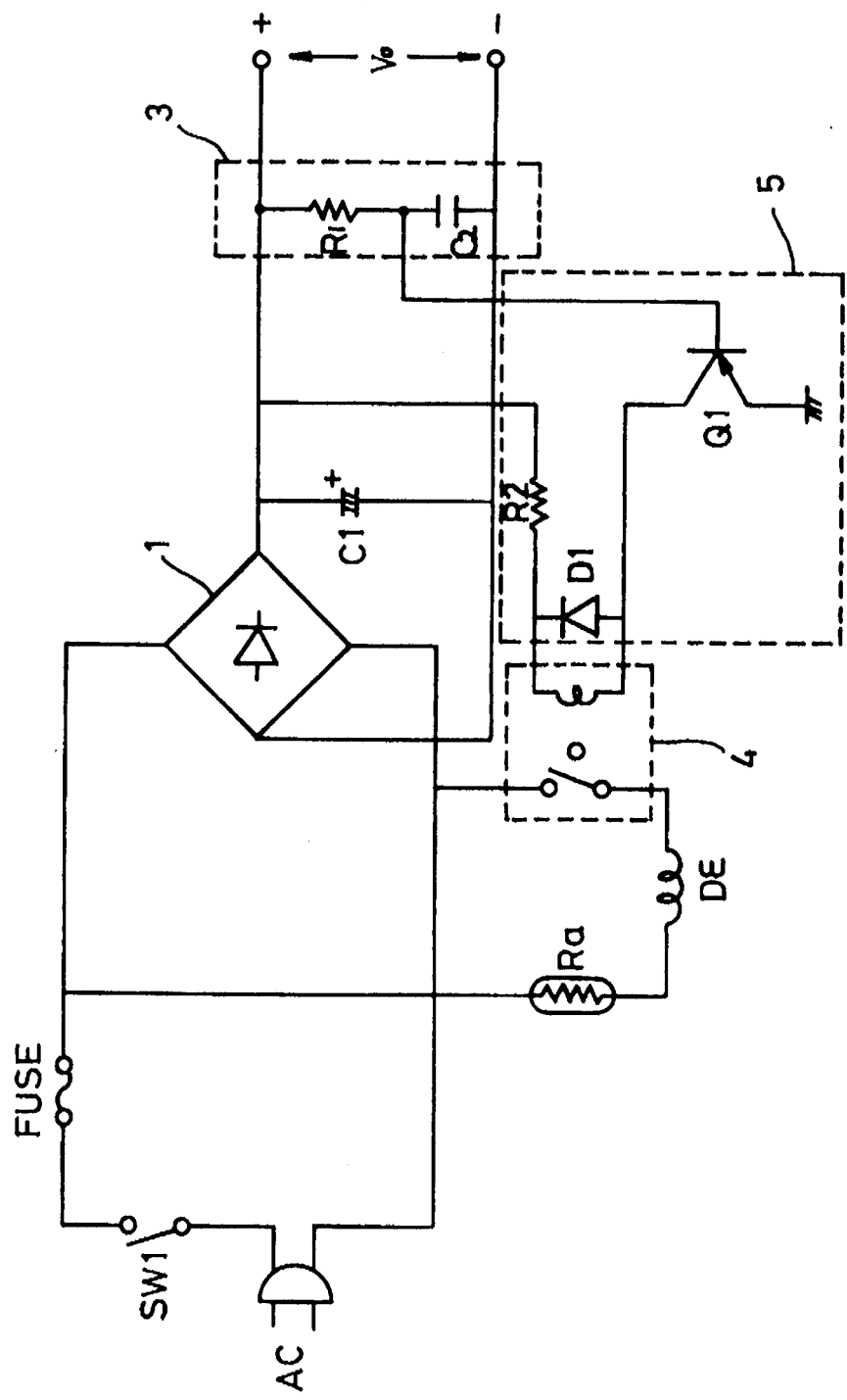
FIG. 2 is a circuit diagram of a degaussing circuit of the present invention.

FIG. 2 is an illustration of a circuit diagram of a degaussing circuit of the present invention. As shown, some elements in FIG. 2 are the same as those in FIG. 1. Therefore, like reference numerals designate like parts.

The rectifying circuit 1 rectifies the AC voltage, inputted through the switch SW1 and the fuse, into the DC voltage. The capacitor C1 acts to smooth the DC voltage from the rectifying circuit 1.

A RC charging circuit 3 is provided with a resistor R1 and a capacitor C2 which is charged by the DC voltage smoothed by the capacitor C1.

The positive temperature coefficient resistor Ra has the resistance which increases with the increase in the temperature due to the AC current flowing therethrough upon application of a power supply voltage. The degaussing coil DE is adapted to remove the magnetic field being present in the tube of the monitor or the TV in response to the AC current flowing through the positive temperature coefficient resistor Ra thereto.

The degaussing circuit of the present invention also includes a relay 4 for controlling the flow of the AC current through the positive temperature coefficient resistor Ra to the degaussing coil DE and a relay driving circuit 5 for controlling the ON/OFF state of the relay 4 in response to the voltage charged on the RC charging circuit 3.

The relay driving circuit 5 includes a transistor Q1, a diode D1 and a resistor R2. The resistor R2 has one side connected to an output of the rectifying circuit 1. The diode D1 has a cathode connected to the other side of the resistor R2. The transistor Q1 has a base connected to an output of the RC charging circuit 3, a collector connected to an anode of the diode D1 and an emitter connected to a ground.

The operation of the degaussing circuit with the above-mentioned construction in accordance with the present invention will hereinafter be described in detail with reference to FIGS. 2 to 7.

As the switch SW1 is turned on, the AC voltage is applied through the fuse to the rectifying circuit 1, which rectifies the applied AC voltage into the DC voltage. The DC voltage from the rectifying circuit 1 is smoothed by the capacitor C1. In the RC charging circuit 3, the DC voltage smoothed by the capacitor C1 charges the capacitor C2 through the resistor R1. Since no voltage is initially present on the capacitor C2, the transistor Q1 remains at its ON state, as shown in FIG. 5, until the DC voltage is charged on the capacitor C2 to a predetermined level. The relay 4 remains at its ON state, as shown in FIG. 6, as the transistor Q1 remains at its ON state.

On the other hand, the resistance of the positive temperature coefficient resistor Ra is about 20Ω upon application of a power supply voltage, as shown in FIG. 3. In this case, the AC current flows to the degaussing coil DE through the positive temperature coefficient resistor Ra. As the AC current flows, the degaussing coil DE removes the magnetic field being present in the tube of the monitor or the TV.

Then, after the predetermined time period (for example, 1 to 2 sec), has elapsed the resistance of the positive temperature coefficient resistor Ra rises to several tens (MΩ)mega ohms as the temperature rises due to the AC current, as shown in FIG. 3. In this case, the AC current flowing through the degaussing coil DE is reduced nearly to 0, being vibrated, as shown in FIG. 7.

Thereafter, as the DC voltage charged on the capacitor C2 in the RC charging circuit 3 rises as shown in FIG. 4, the transistor Q1 is turned off and the relay 4 is thus turned off. Subsequently, the degaussing coil DE is opened, resulting in the flow of no current therethrough. Namely, in this case, no current flows through the degaussing coil DE although the resistance of the positive temperature coefficient resistor Ra is reduced as the temperature falls.

As a result, the AC current flows through the degaussing coil DE only upon application power supply voltage so that the magnetic field can be removed by the degaussing coil DE.

As apparent from the above description, according to the present invention, there is no necessity for generating the heat for the purpose of maintaining the temperature of the positive temperature coefficient resistor constant. Therefore, the power consumption can be reduced and the factor which increases the ambient temperature can be removed.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A degaussing circuit comprising:

means for converting an AC voltage into a DC voltage;

a first capacitor being charged by the DC voltage;

a positive temperature coefficient resistor having a resistance which changes with changing temperature as an AC current flows therethrough upon application of the AC voltage;

a degaussing coil for removing a magnetic field as the AC current flows through said positive temperature coefficient resistor;

a relay to control the flow of the AC current to said degaussing coil; and a circuit for changing an ON/OFF state of said relay based on a voltage level of said first capacitor being charged by the DC voltage, wherein said circuit includes a transistor having a base connected to a terminal of said first capacitor.

2. The degaussing circuit of claim 1, wherein said transistor is turned off after a predetermined period of time has elapsed as said first capacitor is charged to the voltage level due to the application of the AC voltage.

3. The degaussing circuit of claim 2, wherein when said transistor is turned off, said circuit changes the ON/OFF state of said relay so that no current flows through said degaussing coil while the resistance of said positive temperature coefficient resistor is reduced as temperature falls.

4. A degaussing circuit comprising:

means for rectifying an AC voltage inputted therein into a DC voltage;

means for smoothing the DC voltage from said rectifying means;

charging means charged by the DC voltage smoothed by said smoothing means, said charging means having a capacitor and a first resistor;

a positive temperature coefficient resistor having a resistance which increases with an increase in a temperature due to an AC current flowing therethrough upon application of the AC voltage;

a degaussing coil for removing a magnetic field in response to the AC current flowing through said positive temperature coefficient resistor;

a relay for controlling the flow of the AC current through said positive temperature coefficient resistor to said degaussing coil; and relay driving means for controlling an ON/OFF state of said relay in response to the voltage charged on said charging means, said relay driving means including a second resistor having one side connected to an output of said rectifying means, a diode coupled to said relay and having a cathode connected to the other side of said second resistor and a transistor having a base connected to an output of said charging means, a collector connected to an anode of said diode and an emitter connected to a ground.

5. The degaussing circuit of claim 4, wherein said transistor in said relay driving means is turned off by the voltage charged on said charging means after the lapse of a predetermined time period from a point of time of AC voltage application as the resistance of said positive temperature coefficient resistor rises due to the AC current, and said relay is turned off as said transistor is turned off, so that no current flows through said degaussing coil although the resistance of said positive temperature coefficient resistor is reduced as the temperature falls.

6. The degaussing circuit of claim 4, wherein said relay comprises a relay switch and a relay coil, said relay coil being connected in parallel to said diode of said relay driving means.

7. A degaussing circuit comprising:

means for converting an AC voltage into a DC voltage;

a first capacitor being charged by the DC voltage;

a positive temperature coefficient resistor having a resistance which changes with changing temperature as an AC current flows therethrough upon application of the AC voltage;

a degaussing coil for removing a magnetic field as the AC current flows through said positive temperature coefficient resistor;

a relay to control the flow of the AC current to said degaussing coil;

a diode coupled to said relay in parallel;

a second resistor connected in series to said diode; and a circuit for changing an ON/OFF state of said relay based on a voltage level of said first capacitor being charged by the DC voltage, wherein said circuit includes a transistor having a base connected to a terminal of said first capacitor.

8. The degaussing circuit of claim 7, wherein said circuit further comprises said transistor having a collector connected to an anode of said diode, and an emitter connected to a ground.

9. The degaussing circuit of claim 8, wherein said transistor is turned off after a predetermined period of time has elapsed as said first capacitor is charged to the voltage level due to the application of the AC voltage.

10. The degaussing circuit of claim 9, wherein when said transistor is turned off, said circuit changes the ON/OFF state of said relay so that no current flows through said degaussing coil while the resistance of said positive temperature coefficient resistor is reduced as temperature falls.

* * * * *